Feb. 11, 1947.　　L. E. CHAMPER　　2,415,788
METHOD AND APPARATUS FOR FORMING SHEET METAL
Filed Aug. 26, 1942　　2 Sheets-Sheet 1

LEON E. CHAMPER,
INVENTOR.

BY Philip Subkow
ATTORNEY.

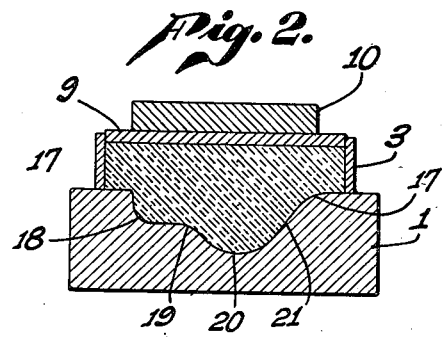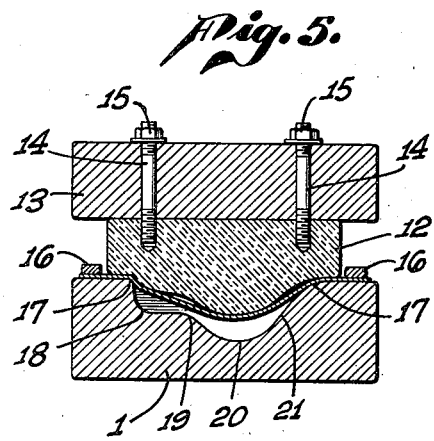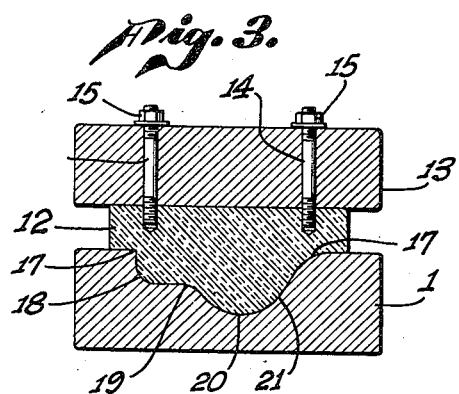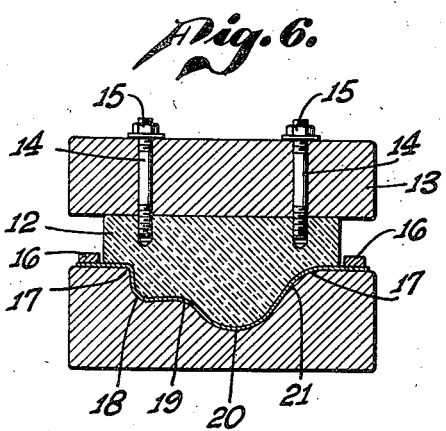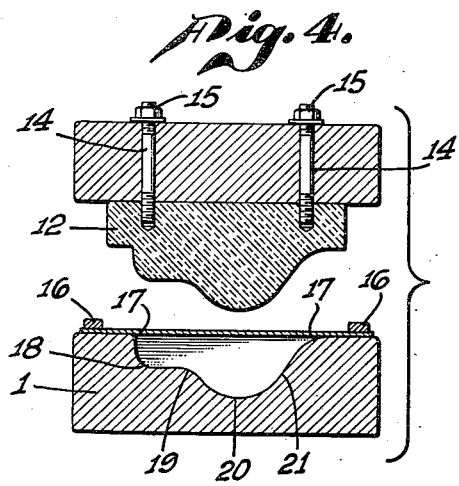

Patented Feb. 11, 1947

2,415,788

UNITED STATES PATENT OFFICE 2,415,788

METHOD AND APPARATUS FOR FORMING SHEET METAL

Leon E. Champer, Burbank, Calif., assignor, by mesne assignments, to Frank H. Rolapp Application August 26, 1942, Serial No. 456,445

13 Claims. (Cl. 113—49)

This application is a continuation in part of Serial No. 430,706, filed February 13, 1942, for improvements in thermoplastics and methods and apparatus for hot casting plastics. I have in that application disclosed plastic compositions suitable for hot casting and methods for casting thermoplastic resins for the production of tools such as dies, jigs, fixtures and form blocks. I have employed in the production of such tools, thermoplastic resins of high impact strength which are non-brittle and have unique mechanical strength, and will stand high impact stresses.

I have now found that the unique properties of the thermoplastic resin compositions disclosed in my previous application, or when suitably modified to develop their properties, to obtain high impact strength, toughness and elasticity, permit me to apply these resin compositions to the forming of sheet metal to produce unique and unexpected results in sheet metal forming processes. This invention therefore relates to a resin composition of high impact strength having the property of deforming under load, but showing sufficient substantial rigidity under high load, and a high elastic recovery when the load is removed. The resin composition is tough in that it requires high loading and high impacts to induce deformation.

This invention also relates to metal forming tools, such as dies, form blocks and punches made of such resin compositions. This invention also relates to methods of forming metal in which sheet metal is bent, stretched, compressed or drawn, by the use of dies, form blocks or punches.

The higher the individual loadings which is permissible, the less the number of stages of loading that will be required to form the metal. A hard metal such as a heat treated steel sheet, or a heat treated high strength aluminum alloy, which has a high yield stress, will require greater forming pressures and greater number of reloadings than will be annealed steel or an annealed aluminum alloy. In order therefore to improve the forming procedure and to reduce the number of loadings, it has been the practice to use annealed sheet metal, or to anneal the sheet metal after the initial stages of loading, and after annealing, to finish the forming operation.

In the drawing process, under ideal conditions of operation it is possible to obtain this forming without thinning of the metal. This is possible only by a careful design of the dies and by the use of punches having absolutely smooth and correct contours. If any unevenness of surface occurs, stresses are concentrated at local spots, introducing excessive compressive stresses and tensile stresses. These local high points cause a non-uniform distribution of forming pressure, resulting in a thinning of a metal with resultant cold working. In drop hammer operations this cold working may be so serious as to require intermediate annealing of the metal being formed.

Another important limitation upon the metal forming processes, especially those of impact forming employing drop hammers and crank operated hammers, arises from the cold working of the metal by the repeated impacts of the tool on the metal being formed. It is well known that as the metal is worked at a higher rate a more nearly uniform mechanical properties throughout its cross section is obtained than if it is formed at a lower rate. The smaller the number of impacts necessary to form the metal, the more uniform the stresses set up in the metal. Non-uniform stresses which are set up by forming the metal by a large number of light blows set up strain hardening which must be removed by annealing of the metal. If this is not done the metal in the final forming operation may crack.

In present operations the number of impacts necessary for forming metal are, because of the nature of the dies and punches employed, relatively large, resulting in a strain hardening of the metal. This requires intermediate annealing of the sheet after partial forming, and final forming of the metal after the annealing operation. Another factor causing strain hardening is the difficulty in inducing uniform forming pressures across the full area of the metal to be formed. The nature of the punches employed in impact forming, and the nature of the metallic die members used in double acting dies, make it impossible to apply uniform forming pressure on the metal. This causes strain hardening. Efforts have been made to avoid this difficulty by the use of rubber platens which are sheets of rubber introduced over the dies, or by using rubber inserts in the die between the metal to be formed and the male member of the die.

I have developed a superior metal forming process in which ideal conditions previously discussed are made possible of attainment to a maximum extent. I employ a metal forming process in which the forming pressure is uniformly applied, and the metal is formed with minimum cold working and no thinning of the metal. No intermediate annealing is necessary. In my process, both the metal and the punch are formed in the die and the surface of the punch undergoes deformation, under the loading resulting in a uniformly applied pressure without substantial deformation of the body of the punch. On unloading the punch recovers elastically so that it is possible to make a large number of parts all of which are identical.

My form of die and punch may be applied both to the double acting press and to the drop hammer, as well as to the stretch die, and in fact to all of the forming procedures previously discussed.

The punch made of my material has resilient qualities which permit it to compress under pressure. The forming pressure is then uniformly distributed over the work being formed. This uniform distribution of forming pressures results in a forming of metal without work-hardening.

It is therefore an object of my invention to form metal in dies by employing a forming tool such as a punch to form the metal in a die, and in so doing to deform the forming tool, such as the said punch, to apply a uniform pressure to the metal in said die.

Prior methods for stamping or impact forming have employed either hard metal dies and punches such as hardened steel, or have employed soft metal punches, such as hardened lead, hardened with antimony, or zinc-aluminum alloys. Rubber has been used in hydraulic press operations, but not as die or punch in impact forming.

In the other method only one shaped die or form block is used, the co-acting die or punch consisting of a pad of rubber confined within a box or frame. The rubber, under the applied pressure, flows around the shaped metal die and acts as a hydraulic fluid pressing the metal sheet against the die. This method is adapted for use only in a press. It has been widely and successfully used, but it likewise has its limitations. It is suitable only for light and relatively soft sheet metal, such as aluminum alloy sheet, and is not well adapted for a tough and springy material such as stainless steel. Also the method is applicable only for parts for which the die can be made all in one part. For shaping parts which require a two-piece die it cannot be used. The method also is suitable only for light or moderate draws, and does not prevent wrinkling where compression accompanies drawing, as in making convex flanges.

In the case of the hardened metal, in order to obtain a desired tool of this material, the metal must be cast, rough shaped, finished shaped, finished machined, allowing for the thickness of the metal to be formed, polished, heat treated, and used with a lubricant, in order to overcome any local welding or fouling resulting in local high stresses, as previously explained. In order to overcome these disadvantages, and the high cost of manufacture of such tools, hardened lead has been employed as punches and zinc-aluminum dies as the forming tool. Such a punch is cast in a mold and then must be shaped and smoothed. Allowance must be made for the contraction of the lead and for the thickness of the metal to be formed. The lead is easily deformed by the impact and shows substantially no resilient recovery. Such dies therefore must be remelted and recast after a limited number of punches. The dies are extremely heavy and cannot be used in large sizes because of handling difficulties at the press. When used in large sizes they may not be lifted by normal methods without sagging and bending and distortion by their unsupported weight. The zinc aluminum punches do have considerable rigidity, resembling steel dies in this respect. The difficulty with using these materials as dies and punches resides in the fact that it is a long and tedious task to grind the zinc-aluminum punch to fit the die, allowing for metal thickness. The punch and die will not shrink the same, so quite a bit of grinding must be done to make them fit. Even then the punch is likely to bruise the part as it forms small radii and hammers out the joggles. If a hammer is the least bit untrue the parts suffer severely.

I have developed a thermoplastic resin composition having unique properties which peculiarly adapt it to be used in my metal forming process. The material has a low specific gravity, slightly greater than water, about 1.18, is easily cast into molds by hot casting operations, and when properly cast will produce absolutely true mirror-like castings conforming absolutely to the surface of the die into which it is cast. The material has a high surface lubricity and on congelation may be easily removed from the die, showing no sticking to the die into which it is cast. Its lubricity enables it to be used in the forming process without seizing the metal and does not require any additional lubrication as is common with metallic dies and punches. The physical and mechanical properties of the resin to meet the requirements of the intended use are a high elastic limit combined with a high degree of hardness and resistance to impact. This combination of properties results in a non-brittle material of great stiffness or resistance to extension as compared with rubber. In other words, the modulus curve is steep as compared to the flat modulus curve of rubber. Since the punch may be cast in the die without metal clearances in forming the sheet metal into the die the punch is squeezed by the metal and the die, and is molded between the metal and the die, exerting a uniform forming pressure to form the metal of the desired contours. The punch, when retracted from the die, recovers elastically to its original shape, thus permitting it to be used repeatedly without recasting.

Unlike the zinc-aluminum and lead punches, my material will not back off from the work and from the joggles and radii. It will not flatten out and get larger, thus forcing the die out of shape or breaking the die. Due to its elastici recovery, it holds its shape so that the die may be used a long time without scraping or remelting the die.

It is therefore an object of my invention to form sheet metal by employing dies and punches of such thermoplastic resin, and at the same time form the resin in the die whereby uniform forming pressure is exerted on the metal, and whereby the resin is deformed by the metal and the die, to produce a true conformation of the metal formed in the die, and whereby on retraction of the punch or the die, the resin regains its original shape.

Another limitation on the use of metal punches in impact forming processes resides in the high specific gravity of the punch, ranging from 6 to 11. This sets a limit on the size and depth of draw permissible with metal punches. In employing my material I am enabled to use much larger punches, due to the low specific gravity of my material. Its specific gravity is around 1.18, and therefore it will be possible without exceeding the permissible impact energies, to employ much larger punches and dies to form much larger sheets of metal. For instance, I have employed punches weighing as much as 670 pounds, which if formed of lead would weigh around 7850 pounds.

It is a further object of my invention to employ thermoplastic resin punches in drop hammer sheet metal forming operations which have a low specific gravity approximating that of water.

It is a further object of my invention to employ thermoplastic resin as a punch in impact forming operations for sheet metal.

It is a further object of my invention to use a hot cast thermoplastic resin as a die or punch in a sheet metal forming operation.

It is a further object of my invention to use a die in which the mating members do not have metal clearance for the sheet metal to be formed.

It is a further object of my invention to create a forming tool for sheet metal forming, of thermoplastic resin having the properties of being molded in the die when it engages said die and the metal being formed therein and recovering its shape when unloaded.

It is a further object of my invention to create a thermoplastic resin punch which may be used in impact forming.

It is a further object of my invention to develop an ethyl cellulose resin composition to which a plasticizer and a hardener is added to develop the above properties.

Further objects of my invention will be apparent from the following more particular description of a preferred embodiment of my invention, taken together with the following figures used to illustrate my invention.

Fig. 2 shows the method of die forming the punch in the die.

Figure 1:
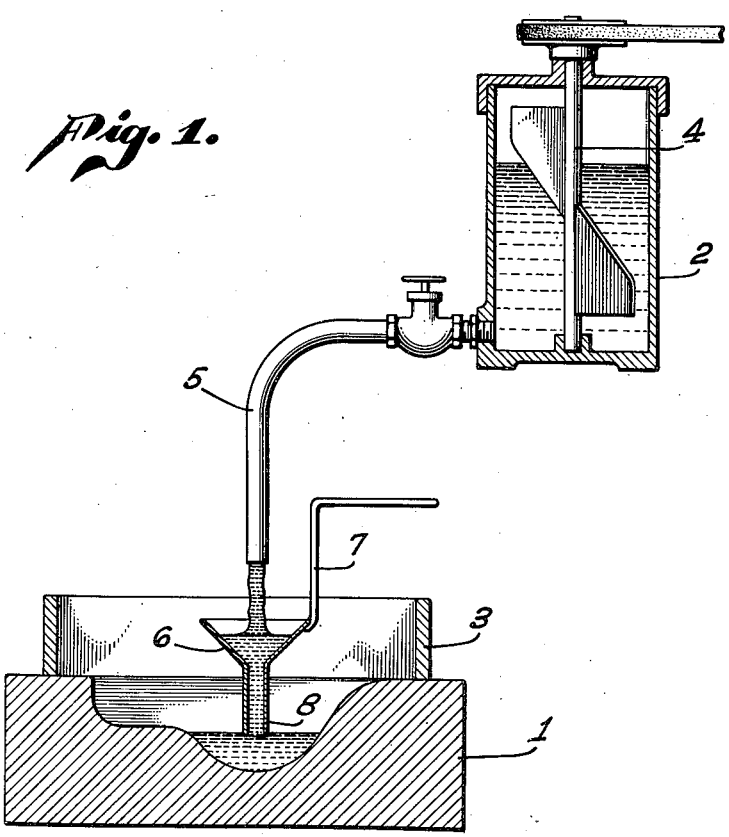
Fig. 1 shows the method employed in hot casting the resin punch in the die.

Fig. 3 to Fig. 6, inclusive, show the various stages of forming the sheet metal in my drop hammer impact forming process.

Without limiting the general nature of my metal forming process, the following are particular examples of the type of resin which show the properties previously described, and which result in my novel process of forming metals.

In my application Serial No. 430,706, I have disclosed fusible thermoplastic resins which may be hot cast to produce castings of absolute conformation to the mold into which it is hot cast. The products described in the examples there given include phenolic resins of the phenol ketone and phenol formaldehyde type. They also include ethyl cellulose resins modified by castor oil or tung oil and phenolic resins and plasticized to develop elasticity and toughness. I have found that a particularly useful formulation may include ethyl cellulose modified by a wax plasticizer and a glyceride of higher fatty acids or hydroxy fatty acids. Such glycerides may include castor oil, hydrogenated castor oil, or other high molecular weight unsaturated acids or their esters, including the esters of the monohydric or polyhydric alcohols or their glycerides. The glycerides of saturated fatty acids, which are waxy in character, are preferred. Such glycerides can be obtained from natural vegetable oils by hydrogenating the latter. For example, a preferred material is hydrogenated castor oil having a melting point above 80° C., i. e., Opal wax, consisting largely of the glyceryl ester of 12-hydroxy stearic acid. Glycerides obtained by hydrogenating other vegetable oils, e. g., cottonseed oil, may also be used. The amount of the high molecular weight acid or its ester is restricted so as to not drop the melting point of the resin composition, and is added in quantities only sufficient to develop the desired toughness, elasticity and impact resistance.

Preferred compositions are prepared from "standard" ethyl cellulose, containing from 48.5% to 49.5% ethoxy groups, and hydrogenated castor oil in the range of proportions by weight of 50 to 80 per cent of ethyl cellulose and 20 to 50 per cent of hydrogenated castor oil. For adjusting the properties of the resinous composition to different service conditions small amounts of plasticizers and hardeners may also be added. The range of proportions by weight for compositions containing plasticizers and/or hardeners is as follows:

| | Per cent |
|---|---|
| Ethyl cellulose | 55–65 |
| Hydrogenated castor oil | 25–30 |
| Compatible plasticizer | 0–15 |
| Compatible resin | 0–10 |
| Mineral wax | 0–3 |

Examples of compatible plasticizers are dibutyl phthalate, dibutyl sebacate, octyl 12-hydroxy stearate, and other alkyl esters of 12-hydroxy stearic acid.

Compatible resin hardeners are straight phenol-formaldehyde resins and coumarone-indene resins.

A suitable mineral wax is paraffin which serves as an added lubricant.

The physical properties of such compositions for use according to this invention may be measured by the hardness and impact-resistance. The hardness should be from 50 to 80 on the Rockwell scale, and the impact-resistance at least 10 inch-pounds at 32° F. Whenever the term "Rockwell scale" or "Rockwell hardness" occurs, it shall be determined by the following test method. In this Rockwell hardness test a 15 kg. load and one-half inch ball are used at a temperature of 70° F. The load was applied for 15 seconds and then released for 15 seconds before taking the reading. Disk castings one-quarter inch thick are used for the measurement.

A representative example of a composition that has been successfully used according to the invention has the following formula, by weight:

| | Per cent |
|---|---|
| Ethyl cellulose | 60 |
| Hydrogenated castor oil (having a melting point in excess of 80° C.) | 29 |
| Octyl 12-hydroxy stearate | 5 |
| Superbeckacite 2000 | 5 |
| Paraffin | 1 |

In the above formula, Superbeckacite 2000 is a trade-name identifying a commercial straight phenol-formaldehyde resin.

The physical properties of the above composition are:

| | |
|---|---|
| Rockwell hardness | 80 |
| Impact-resistance at— | |
| 70° F. _____ inch-pounds | 30–40 |
| 32° F. _____ do | 10–20 |
| Ultimate load in impact-tension test at 79° F. (2" gage length .582 square inch diameter specimen) _____ foot-pounds | 72 |

In casting a die from a resinous composition such as that just described, I proceed as follows:

In forming dies and punches of the above plastic I have found that accurate dies and punches may be obtained by employing the hot casting methods developed and described in my application Serial No. 430,706, and by other methods.

The metal templates or metal master parts obtained by any well known method now employed in making templates or master parts are used for hot casting of the punch or die according to the methods disclosed in my application Serial No. 430,706. In these methods the metallic template or master part is mounted as a mold and a box is built around the part so that walls are raised above the mold to constrain and hold the melt. The resin composition is raised to around 180–220°, agitated for a considerable period of time in order to disengage all air that is in the resin composition, the resin composition is then allowed to cool down to about 10 or 20 degrees above its melting point, and is agitated for additional time to insure the disengaging of the air and the absolute uniformity of the resin composition. It is desirable to maintain the resin in a viscous state to assure that the resin does not entrain air while it is being poured. The material at the casting temperature is poured into the mold against the metal template or part and the walls are cooled so that the temperature gradient is established outward from the interior of the body and through the metal template, or the walls of the mold.

The die may also be cast from this metal template in the same manner by inverting the template in the mold. The punch and die which may therefore be of the double acting die type, will have mirror surfaces, that is, of exactly complementary conformation, and there will be a clearance between the two die members exactly equal to the thickness of the metal.

Instead of using the metallic member or template, a plaster splash of that member may be used. The template is mounted on a board and supported by wire framework, plaster is poured into the framework to form a plaster cast, and a finish coat of plaster applied. The plaster mold, thus formed, is mounted in a mold box and the resin composition cast directly into the plaster mold. A punch may thus be formed directly from the plaster splash.

Dies for use in conjunction with punches made from the above described elastic resin may be formed of a rigid non-yielding metal from such splashes by the conventional manner. Thus the splash formed as previously described is used in making a sand mold. A molten zinc aluminum alloy such as is now employed as die material, i. e., a commercial alloy known by the trade name Kirksite, is poured in the sand mold and allowed to solidify. The finished die is then ground to size.

The die may then be used as the mold for making the resin punch. Fig. 1 illustrates the method by which the resin punch may be cast into a die such as a zinc-aluminum die. The die illustrated as 1, formed in the above or any other manner, is mounted underneath the heated kettle 2. The walls of the die are built up by metal lined boards 3 to form a box. The kettle 2 is provided with an agitator 4, suitable heating jackets, not shown, and a spout 5. The resin composition such as the ethyl cellulose hydrogenated castor oil composition, modified by the Superbeckacite, Opal wax and paraffin, previously set forth in detail, is brought gradually to a temperature of 210° C. with constant agitation, and after reaching 210° C. is agitated for about 35 minutes. During this heating the resin is made homogeneous and deaerated, all moisture and air being disengaged. The resin mixture is then allowed to cool with constant agitation to about 170° C. The temperature is sufficiently high above the melting point of the resin to give a viscous but flowable melt. The funnel 6 carried by arm 7 is then placed inside the die and the spout 5 opened to permit the resin composition to run into the funnel and out the mouth 8 of the funnel. The funnel is raised gradually by the handle 7, as the resin enters the mold, keeping the mouth of the funnel always submerged in the molten resin. By this procedure the resin is run into the mold and fills the mold, and the box formed by the walls 3 without allowing any air to be folded into or otherwise entrained in the resin.

When the box is filled and has cooled down somewhat, but has not yet solidified, and before a crust forms at the top of the melt, a plate or board 9 is set on top of the resin (see Fig. 2) and a weight 10 placed on the board. The weight and board presses the resin into the mold during the congealing process, and the resin is die cast into its mold. When the resin has congealed, the boards 3 are removed, together with the plate 9 and weight 10. The formed punch is readily removed from the die. I have thus formed a punch whose surface is a mirror image of the die surface, and there is absolute conformation between the die and the punch. The casting is so accurate that every variation in the surface of the die is reproduced in the punch. The pressure applied to the surface of the melt squeezes the melt and causes a uniform contraction across the whole surface of the melt and the melt congeals without shrink holes.

Figs. 3 to 6 illustrate the forming process, as applied to a drop hammer operation, employing the above punch and die. In Fig. 4 is shown the die 1, the punch 12, and the hammer head 13. The punch 12 is connected to the hammer head 13 by studs 14 which have been set into the plastic before it has congealed. It is bolted to the head 13 by bolts 15. The hammer head may weigh several thousand pounds. The resin punch may weigh up to several hundred pounds, depending on its size. Figs. 4 to 6 show the forming of metal with the die and resin punch formed without metal clearance. The forming operation is started (see Fig. 4) by raising the punch 12 to the height required in the forming operation, which may be anywhere from say 8 inches to several feet. The sheet of metal to be formed is clamped on the die 1 by a clamping ring 16, as is conventional. The clamping pressure is such as to prevent the metal from wrinkling while it is being formed, but is insufficient to prevent the metal from slipping under the clamping ring while it is being formed over the forming radii 17. The first operation is to drop the hammer head so as to set the metal in the die. See Fig. 5. The metal flows over the forming radii 17 and the punch is compressed and formed at these forming radii and against the metal and is molded therein to compensate for the thickness of the metal without substantial deformation of the body of the punch. The hammer is then raised and again descends (see Fig. 6) forming the metal into the die over the forming radii 17, 18, 19, 20, 21. The resin punch is molded against the metal and the die.

The compression of the punch resulting from the forcing of the die into the mold in which the metal is set, causes a lateral compression of the metal at the forming radii 17 and at the sides of the mold adjacent thereto. The metal is thus formed under the compressive and tensile forces set up by the action of the compressed punch as it enters the die. The punch material under the impact and compressive forces has sufficient rigidity that it does not back off from the radii such as 18 and 20, but enters and forms the metal therein. The forming pressure is uniformly distributed across the whole surface of the metal in the die 1.

Due to lubricity of the die arising from the slippery nature of the resin composition, there are no local seizures at the engaging surfaces between the punch and the metal, and the pressure is therefore, for this reason, also uniformly applied.

The head is then raised and the punch disengaged from the metal and the die and immediately recovers elastically to approximately its original position shown in Figs. 3 and 4. It will be observed that the amount of deformation of the punch is equal to the thickness of the metal being formed.

Numerous important advantages of a wholly unexpected nature are derived from the practice of the present invention utilizing a lower die of rigid material, which is substantially non-yielding under conditions of service, in co-operation with an upper die or punch of an elastic, yieldable resinous material. The number of strokes required for shaping a particular piece in drop-hammer practice is reduced, increasing rate of production, and also reducing the tendency to strain hardening of the shaped piece. Heavier and tougher material can be shaped, as, for example, stainless steel, as well as light metal alloys. Deeper draws can be made. Larger parts can be formed than was possible by previous methods. The life of the dies, both upper and lower, is increased, and a larger output from a single set of dies can be obtained.

Result of considerable experience in the use of my forming process and the material employed therein, is illustrated by the following example which is characteristic in the comparative advantages of my process and material. In employing this procedure in drop hammer drawing operation using a zinc aluminum die and a lead punch, the following schedule had to be followed. In forming 100 parts, each of the parts is hit one time by the punch. The deformed parts then must all be annealed. A new punch is then poured since the lead punch has become battered out of shape. Ten parts are then hit again. The punch has then become sufficiently deformed so that rubber strips must be introduced between the sheet metal and the lead punch, to fill out the radii. The remaining 90 parts are then hit, using these rubber strips, and from 3 to 6 hits per part are necessary.

In my procedure, using the resin punch, each part is hit one fairly good blow to set the part in the die. Three blows in rapid succession are given to the part, and the part is finished. It will be seen that in using my procedure the pouring of an extra punch is eliminated, the annealing is eliminated, and the rehit operations using the rubber to fill in is eliminated. One part is set in the die and finished without removal. In excess of 13,000 hits have been delivered with one resin punch of my invention, without showing any deformation, and the punch was as good as new at the end of the 13,000 hits, the last part formed being as true as the first. This punch is still in use. This important consideration permits of speeding up of work, avoids the necessity of the intermediate annealing, and the use of the rubber strips to fill out the radii. The effect of the character of the punch on the uniformity of the draw is seen from the above comparison, where no intermediate annealing of the work was necessary.

The reduction in the number of hits necessary to form the metal resulting from the higher rates of working of the metal additionally assists in minimizing the cold working of the metal and minimizes the strain hardening of the metal. As a result of the uniform distribution of pressure and the higher working rates made possible by the nature of the punch, cold working is so reduced as to make unnecessary any intermediate annealing of the metal.

These effects result in a most important advantage, resulting in a great saving of time. In fact, I have been able to deep draw and stamp hardened sheet steel, for example 0.063 inch stainless steel and aluminum. I have employed my process and material in forming sheet metal, such as heat treated or annealed aluminum, without any intermediate annealing, and to obtain heat treated formed metal without any intermediate annealing and heat treating.

Whereas in previous operations thinning of the metal is a common occurrence resulting in defective parts, I have been able as a result of the application of the uniform forming pressure by means of the resin die to form metals without any loss in thickness. As a comparison, in forming .037 stainless steel as much as .0015 inch is lost at the forming radius. In employing my procedure on the same operation no thinning at the radius has been encountered. Another advantage of my operation is that the die is self-lubricating, having a high surface lubricity. This arises from the nature of the material employed in the punch and permits of the forming operation occurring without seizure at local spots, and avoids the tearing or thinning of the metal. No lubricant is required between the punch and the metal to be formed. The surface of the punch, since it is formed by a casting operation under conditions to produce a mirror surface, absolutely true and smooth, also aids in the production of this advantageous result.

I claim:

1. A method of impact forming of sheet metal between an elastically compressible punch of substantial rigidity made of a castable thermoplastic resinous material and a rigid die, the mating surfaces of said punch and die conforming without metal clearance, which comprises placing a sheet of metal over said die, forcing the sheet of metal into said die by impact of said punch on said metal to form said metal in said die, said punch on said impact being forced into said formed metal to conform said punch to said formed metal, the punch upon the termination of said impact exerting a uniform compressive force against said metal, and withdrawing said punch from said metal, said punch on said withdrawal elastically and substantially regaining its original shape again to conform to said die without metal clearance.

2. A method of impact forming a plurality of sheet metal parts by forming a plurality of sheets of metal between an elastically compressible punch of substantial rigidity made of a castable thermoplastic resinous material and a rigid die, the mating surfaces of said punch and die conforming without metal clearance, which comprises placing a sheet of metal over said die, forcing the sheet metal into said die by repeated impact of said punch on said metal, said punch deforming on each impact to force said metal into said die, without any substantial deformation of said die, to form said metal in said die and to conform said punch to said metal, the punch upon the termination of said impact exerting a uniform compressive force against said metal, withdrawing said punch between each impact without withdrawing said metal from said die, said punch elastically and substantially regaining its original shape to conform to said die without metal clearance upon such withdrawal, continuing said impacts and the intermediate withdrawal until said metal conforms to said rigid die and said punch conforms to said metal, and then withdrawing said punch, whereby said punch substantially regains its original shape to conform to said rigid die without metal clearance.

3. A method of impact forming a plurality of sheet metal parts by forming a plurality of sheets of metal between an elastically compressible punch of substantial rigidity made of a castable thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a saturated higher fatty acid, said glyceride being in amount equal to more than about 20% of said material, and a rigid die, the mating surfaces of said punch and die conforming without metal clearance, which comprises placing a sheet of metal over said die, forcing the sheet metal into said die by repeated impact of said punch on said metal, said punch deforming on each impact to force said metal into said die, without any substantial deformation of said die, to form said metal in said die and to conform said punch to said metal, the punch upon the termination of said impact exerting a uniform compressive force against said metal, withdrawing said punch between each impact without withdrawing said metal from said die, said punch elastically and substantially regaining its original shape to conform to said die without metal clearance upon such withdrawal, continuing said impacts and the intermediate withdrawal until said metal conforms to said rigid die and said punch conforms to said metal, and then withdrawing said punch, whereby said punch substantially regains its original shape to conform to said rigid die without metal clearance.

4. A method of impact forming of sheet metal between an elastically compressible punch of substantial rigidity made of a castable thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a saturated higher fatty acid, said glyceride being in amount equal to more than about 20% of said material, and a rigid die, the mating surfaces of said punch and die conforming without metal clearance, which comprises placing a sheet of metal over said die, forcing the sheet of metal into said die by impact of said punch on said metal to form said metal in said die, said punch on said impact being forced into said formed metal to conform said punch to said formed metal, the punch upon the termination of said impact exerting a uniform compressive force against said metal, and withdrawing said punch from said metal, said punch on said withdrawal elastically and substantially regaining its original shape again to conform to said die without metal clearance.

5. Complementary sheet metal forming dies, the complementary surfaces of which conform without metal clearance, one of said dies being composed of a thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a saturated higher fatty acid, said glyceride being in amount equal to more than about 20% of said material.

6. A sheet metal shaping die member having surfaces complementary, without metal clearance, to a mating die, said first-mentioned die member being composed of a thermoplastic resinous material, having a hardness above 50 on the Rockwell scale and an impact resistance of at least 10 inch-pounds at 32° F., and containing as ingredients ethyl cellulose in an amount to form a major constituent of said ingredients and a glyceride of a saturated higher fatty acid, said glyceride being in amount equal to more than about 20% of said material.

7. A method of impact forming a plurality of sheet metal parts by forming a plurality of sheets of metal between an elastically compressible punch of substantial rigidity made of a castable thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a higher hydroxy fatty acid, said glyceride being in amount equal to more than about 20% of said material, and a rigid die, the mating surfaces of said punch and die conforming without metal clearance, which comprises placing a sheet of metal over said die, forcing the sheet metal into said die by repeated impact of said punch on said metal, said punch deforming on each impact to force said metal into said die, without any substantial deformation of said die, to form said metal in said die and to conform said punch to said metal, the punch upon the termination of said impact exerting a uniform compressive force against said metal, withdrawing said punch between each impact without withdrawing said metal from said die, said punch elastically and substantially regaining its original shape to conform to said die without metal clearance upon such withdrawal, continuing said impacts and the intermediate withdrawal until said metal conforms to said rigid die and said punch conforms to said metal, and then withdrawing said punch, whereby said punch substantially regains its original shape to conform to said rigid die without metal clearance.

8. A method of impact forming of sheet metal between an elastically compressible punch of substantial rigidity made of castable thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a higher hydroxy fatty acid, said glyceride being in amount equal to more than about 20% of said material, and a rigid die, the mating surfaces of said punch and die conforming without metal clearance, which comprises placing a sheet of metal over said die, forcing the sheet of metal into said die by impact of said punch on said metal to form said metal in said die, said punch on said impact being forced into said formed metal to conform said punch to said formed metal, the punch upon the termination of said impact exerting a uniform compressive force against said metal, and withdrawing said punch from said metal, said punch on said withdrawal elastically and substantially regaining its original shape again to conform to said die without metal clearance.

9. Complementary sheet metal forming dies, the complementary surfaces of which conform without metal clearance, one of said dies being composed of a thermoplastic resinous material having a hardness above 50 on the Rockwell scale and an impact resistance of at least 10 inch-pounds at 32° F., and containing as ingredients ethyl cellulose in an amount to form a major constituent of said ingredients and a glyceride of a higher hydroxy fatty acid, said glyceride being in amount equal to more than about 20% of said material.

10. A sheet metal shaping die member having surfaces complementary, without metal clearance, to a mating die, said first-mentioned die member being composed of a thermoplastic resinous material, having a hardness above 50 on the Rockwell scale and an impact resistance of at least 10 inch-pounds at 32° F., and containing as ingredients ethyl cellulose in an amount to form a major constituent of said ingredients and a glyceride of a higher hydroxy fatty acid, said glyceride being in amount equal to more than about 20% of said material.

11. A method of impact forming of sheet metal between an elastically compressible punch of substantial rigidity made of a castable thermoplastic resinous material having a hardness above 50 on the Rockwell scale and an impact resistance of at least 10 inch-pounds at 32° F., and containing as ingredients ethyl celulose in an amount to form a major constituent of said ingredients and hydrogenated castor oil, said hydrogenated castor oil being in amount equal to more than about 20% of said material, and a rigid die, the mating surfaces of said punch and die conforming without metal clearance, which comprises placing a sheet of metal over said die, forcing the sheet of metal into said die by impact of said punch on said metal to form said metal in said die, said punch on said impact being forced into said formed metal to conform said punch to said formed metal, the punch upon the termination of said impact exerting a uniform compressive force against said metal, and withdrawing said punch from said metal, said punch on said withdrawal elastically and substantially regaining its original shape again to conform to said die without metal clearance.

12. Complementary sheet metal forming dies, the complementary surfaces of which conform without metal clearance, one of said dies being composed of a thermoplastic resinous material having a hardness above 50 on the Rockwell scale and an impact resistance of at least 10 inch-pounds at 32° F., and containing as ingredients ethyl cellulose in an amount to form a major constituent of said ingredients and hydrogenated castor oil, said hydrogenated castor oil being in amount equal to more than about 20% of said material.

13. A sheet metal shaping die member having surfaces complementary, without metal clearance, to a mating die, said first-mentioned die member being composed of a thermoplastic resinous material, having a hardness above 50 on the Rockwell scale and an impact resistance of at least 10 inch-pounds at 32° F., and containing as ingredients ethyl cellulose in an amount to form a major constituent of said ingredients and hydrogenated castor oil, said hydrogenated castor oil being in amount equal to more than about 20% of said material.

LEON E. CHAMPER.

REFERENCES CITED

The following references are of record in the file of this patent:

UNITED STATES PATENTS

| Number | Name | Date |
| --- | --- | --- |
| 814,568 | Stagg | Mar. 6, 1906 |
| 1,982,318 | Oestnaes | Nov. 27, 1934 |
| 616,976 | Sagendorph | Jan. 3, 1899 |
| 1,940,294 | Calkins | Dec. 19, 1933 |
| 2,206,812 | Fitzgerald | July 2, 1940 |
| 369,955 | Meyer | Sept. 13, 1887 |
| 1,935,916 | Ragsdale | Nov. 21, 1933 |
| 2,016,569 | Zinser | Oct. 8, 1935 |
| 1,928,712 | Walsh | Oct. 3, 1933 |
| 815,807 | Freeborn | Mar. 20, 1906 |
| 1,143,432 | Proskover | June 15, 1915 |
| 1,806,147 | Craigo | May 19, 1931 |

FOREIGN PATENTS

| Number | Country | Date |
| --- | --- | --- |
| 257,455 | German | Mar. 8, 1913 |